US009811138B2

(12) United States Patent
Haukom et al.

(10) Patent No.: US 9,811,138 B2
(45) Date of Patent: Nov. 7, 2017

(54) POWER SUPPLY SYSTEM FOR AN ELECTRONIC FLIGHT BAG

(71) Applicant: Rosemount Aerospace Inc., Burnsville, MN (US)

(72) Inventors: Michael Haukom, Burnsville, MN (US); Thomas J. Horsager, Burnsville, MN (US); Brett Willenbring, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 0 days.

(21) Appl. No.: 15/136,589

(22) Filed: Apr. 22, 2016

(65) Prior Publication Data

US 2016/0239064 A1    Aug. 18, 2016

Related U.S. Application Data (63) Continuation of application No. 13/176,637, filed on Jul. 5, 2011, now Pat. No. 9,347,790.

(51) Int. Cl.
| G06F 1/00 | (2006.01) |
| G06F 1/28 | (2006.01) |
| G01C 23/00 | (2006.01) |
| G06F 1/26 | (2006.01) |
| G06F 1/30 | (2006.01) |
| B64D 45/00 | (2006.01) |

(52) U.S. Cl.
CPC .............. G06F 1/28 (2013.01); G01C 23/00 (2013.01); G06F 1/263 (2013.01); G06F 1/266 (2013.01); G06F 1/30 (2013.01); B64D 2045/0075 (2013.01); Y02T 50/53 (2013.01)

(58) Field of Classification Search
CPC . G06F 1/28; G06F 1/263; G06F 1/266; G01C 23/00; F06G 1/30
USPC ........................................................ 713/300
See application file for complete search history.

(56) References Cited

U.S. PATENT DOCUMENTS

| 6,806,589 B1 * | 10/2004 | Suttie ...................... H02J 9/062 307/73 |
| 7,406,623 B2 * | 7/2008 | Takahashi ............... H02J 9/061 713/300 |
| 7,560,831 B2 | 7/2009 | Whitted et al. |

(Continued)

FOREIGN PATENT DOCUMENTS

| CN | 201789331 U | 4/2011 |
| EP | 1610094 A1 | 12/2005 |

OTHER PUBLICATIONS

Pending Claims and Search Opinion dated Dec. 9, 2013 in Counterpart European Application No. EP 12 17 5015.

(Continued)

*Primary Examiner* — Robert Cassity
(74) *Attorney, Agent, or Firm* — Locke Lord LLP; Scott D. Wofsy; Christopher J. Cillié

(57) ABSTRACT

A control system for providing electrical power to an electronic flight bag device on an aircraft. The control system including a power switching component coupled to a plurality of power sources and at least one electronic flight bag device. The power switching component is operative and configured to selectively apply electrical power from at least one of the plurality of power sources to the at least one electronic flight bag device based upon a condition of the aircraft.

19 Claims, 5 Drawing Sheets

(56) References Cited

U.S. PATENT DOCUMENTS

| | | |
|---|---|---|
| 7,656,637 B2 | 2/2010 | McAvoy et al. |
| 7,769,501 B2 | 8/2010 | Lusardi et al. |
| 2006/0098358 A1 | 5/2006 | Wambsganss et al. |
| 2007/0253135 A1 | 11/2007 | Bovitz |
| 2008/0238191 A1 | 10/2008 | Cottingham et al. |
| 2009/0121546 A1 | 5/2009 | Langlois et al. |
| 2010/0071881 A1 | 3/2010 | Murer et al. |
| 2010/0105329 A1* | 4/2010 | Durand ............... H04B 1/3877 455/41.2 |
| 2012/0318914 A1 | 12/2012 | Rajashekara et al. |

OTHER PUBLICATIONS

Search Opinion dated Dec. 9, 2013 in Counterpart European Application No. EP 12 17 5015.
Pending Claims and Office Action dated Oct. 21, 2014 in Counterpart Canadian Patent Application No. 2,782,060.
Examination report issued Jun. 14, 2016 in connection with EP Application No. 12175015.2.
Chinese Office Action Issued Nov. 2, 2016 for Application No. 201210231701.7 with English Translation.

* cited by examiner

EFB Life Cycle

Fig. 1

EFB Plan Phase

POWER SUPPLY SYSTEM FOR AN ELECTRONIC FLIGHT BAG

CROSS-REFERENCE TO RELATED APPLICATIONS

This Application is a continuing application of U.S. patent application Ser. No. 13/176,637, filed Jul. 5, 2011, the contents which is incorporated by reference herein in its entirety.

FIELD OF THE INVENTION

The invention relates to an electronic flight bag for use on board an aircraft, and more specifically, to a power supply system for use with an on board electronic flight bag.

BACKGROUND OF THE INVENTION

Electronic flight bags for use aboard an aircraft during flight are known. The typical electronic flight bag includes an electronic storage device which acts as a container for storing various user-configurable flight-related objects, such as flight routes as defined by way-points, airport information that includes approach routes, associated fight charts or other desired charts, temporary flight restrictions, and weather information as well as any other user-defined data objects associated with the flight. For example, the electronic flight bag may be used in corporate aircraft and may include one or more data objects that relate to the corporate policies with respect to flights.

Since the ability for pilots to access navigation related information is mandated by FAA regulation, electronic flight bag systems currently used to replace paper-based navigation charts must be proven to exhibit equivalent or better reliability levels than corresponding paper-based navigation charts. For instance, regulatory agencies such as the FAA have provided guidance materials to airlines regarding suggested risk mitigations when transitioning from paper based to electronic navigation charts, which material suggests the need for separate backup power sources. The industry has responded to the aforesaid regulatory guidance by implementing electronic flight bag standby battery sources. However, at least the following disadvantages are associated with such standby battery sources: repetitive maintenance is needed due to battery maintenance (which increases life cycle costs) and the delays associated with certification challenges related to electronic flight bag safety (e.g., fire hazard, electrolyte leaks).

SUMMARY OF THE INVENTION

In one aspect an electronic flight bag control system is described in which an aspect of the invention includes selectively applying electronic power to an electronic flight bag device. In an illustrative embodiment, the control system includes a power switching component coupled to a plurality of power sources. At least one electronic flight bag device is coupled to each of the plurality of power sources via the power switching component. The power switching component is operative and configured to selectively apply electrical power from at least one of the plurality of power sources to the at least one electronic flight bag device based upon a condition of the aircraft to ensure redundant and reliable power delivery to the electronic flight bag.

In a further aspect, the power switching component is further operative and configured to couple only a single power source from the plurality of electrical power sources to the electronic flight bag device when a predetermined condition for the aircraft has occurred and is further operative and configured to couple at least first and second power sources from the plurality of electrical power sources to the electronic flight bag device when another predetermined condition for aircraft has occurred.

BRIEF DESCRIPTION OF THE DRAWINGS

The objects and features of the invention can be understood with reference to the following detailed description of an illustrative embodiment of the present invention taken together in conjunction with the accompanying drawings in which.

WRITTEN DESCRIPTION OF CERTAIN EMBODIMENTS OF THE INVENTION

The present invention is now described more fully with reference to the accompanying drawings, in which an illustrated embodiment of the present invention is shown. The present invention is not limited in any way to the illustrated embodiment as the illustrated embodiment described below is merely exemplary of the invention, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present invention. Furthermore, the terms and phrases used herein are not intended to be limiting but rather to provide an understandable description of the invention.

It is to be appreciated the embodiments of this invention as discussed below are preferably a software algorithm, program or code residing on computer useable medium having control logic for enabling execution on a machine having a computer processor. The machine typically includes memory storage configured to provide output from execution of the computer algorithm or program.

The present invention relates to an Electronic Flight Bag (EFB) for use on board an aircraft during flight. The electronic flight bag may be configured as a device integrated into the flight cockpit or as a standalone portable device which contains all of the information normally included in a physical flight bag that may be required and desired for a particular flight contained in furtherance of a paperless cockpit environment. In particular, the flight bag includes an electronic storage device configured as a container for storing various user-configurable flight-related objects. Unlike known navigational aids in which the data objects are fixed, the electronic flight bag in accordance with the present invention is formed from user-configured data objects so as to obviate the necessity of a physical flight bag. During a ground phase, the electronic flight bag is typically populated with all data required and desired during a particular flight onto a standalone computing platform and carried on board the aircraft for use during a flight phase and thus avoids the necessity for a physical flight bag.

Figure 1:
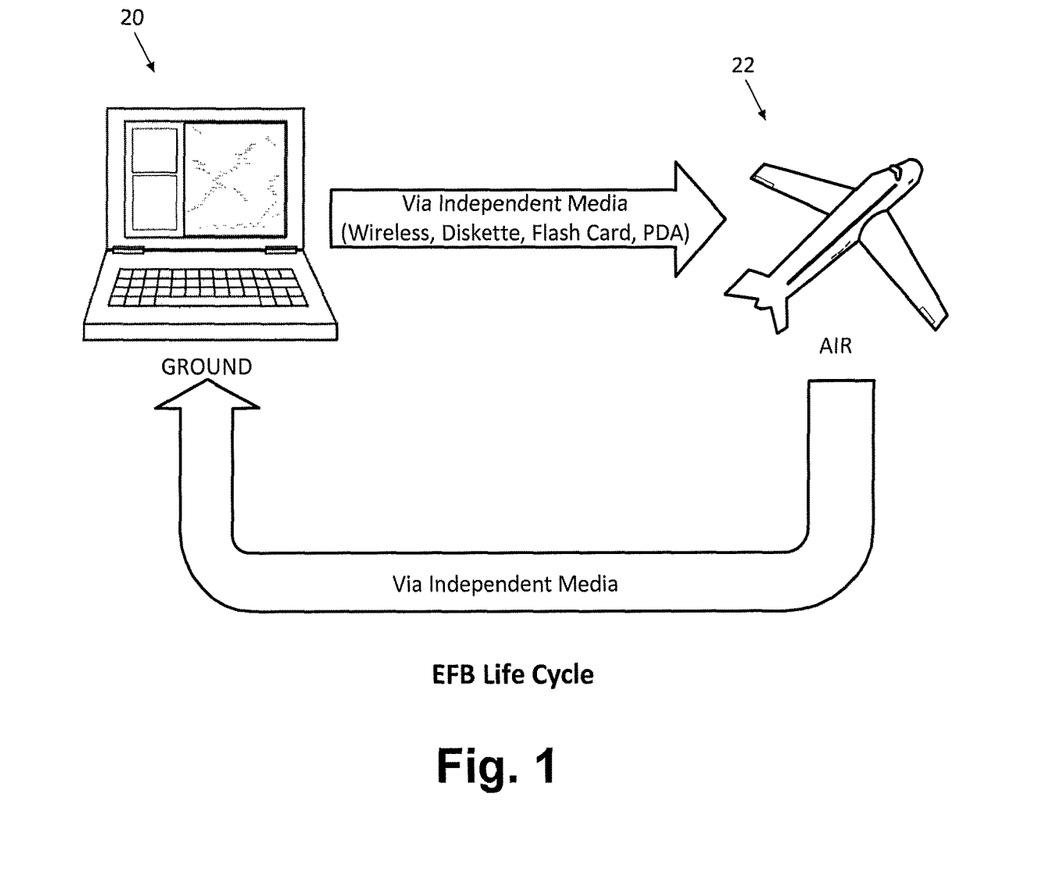
FIG. 1 is a block diagram illustrating an exemplary life cycle of the electronic navigational system used in accordance with an illustrated embodiment of the invention.

Turning now descriptively to the drawings, in which similar reference characters denote similar elements throughout the several views, FIG. 1 illustrates the life cycle of the electronic flight bag in accordance with the present invention. Like conventional systems, flight information required during a flight is assembled on the ground and carried aboard the aircraft for use during the flight. The electronic flight bag in accordance with the present invention emulates a physical flight bag in that contains all of the information required and desired by a pilot during a particular flight. Moreover, since the data required for a flight normally varies for a particular user (i.e., commercial, private, or military) and for a particular flight, the electronic flight bag can be used in all of such applications. As will be discussed below, the user may select from various data objects and store those objects on an electronic storage medium or electronic container by way of a computing platform, such as a personal computer. Just as a pilot decides what information to include in a physical flight bag, a user of the electronic flight bag in accordance with the present invention can load various flight-related objects, as discussed below, into the electronic container for use aboard the aircraft 22 during flight. This information can be obtained from various sources, including aircraft navigational data content providers, aircraft manufacturer content providers, as well as third-party content providers.

The electronic container may be, for example, a standalone electronic medium, such as an electronic storage device, such as a diskette, flash card, flash drive or be hosted by a standalone computing environment, such as a personal computer 20 or a personal digital assistant (PDA), not shown. The electronic container may be portable and thus can be carried aboard an aircraft 22 and accessed during a flight phase and hosted by a computing platform. In order to avoid re-certification of the aircraft's existing on-board navigational system, the electronic container is hosted by a computing platform independent from the aircraft's on-board navigational system. The data in the electronic computer may be updated during flight and stored for use in future flights.

Figure 2:
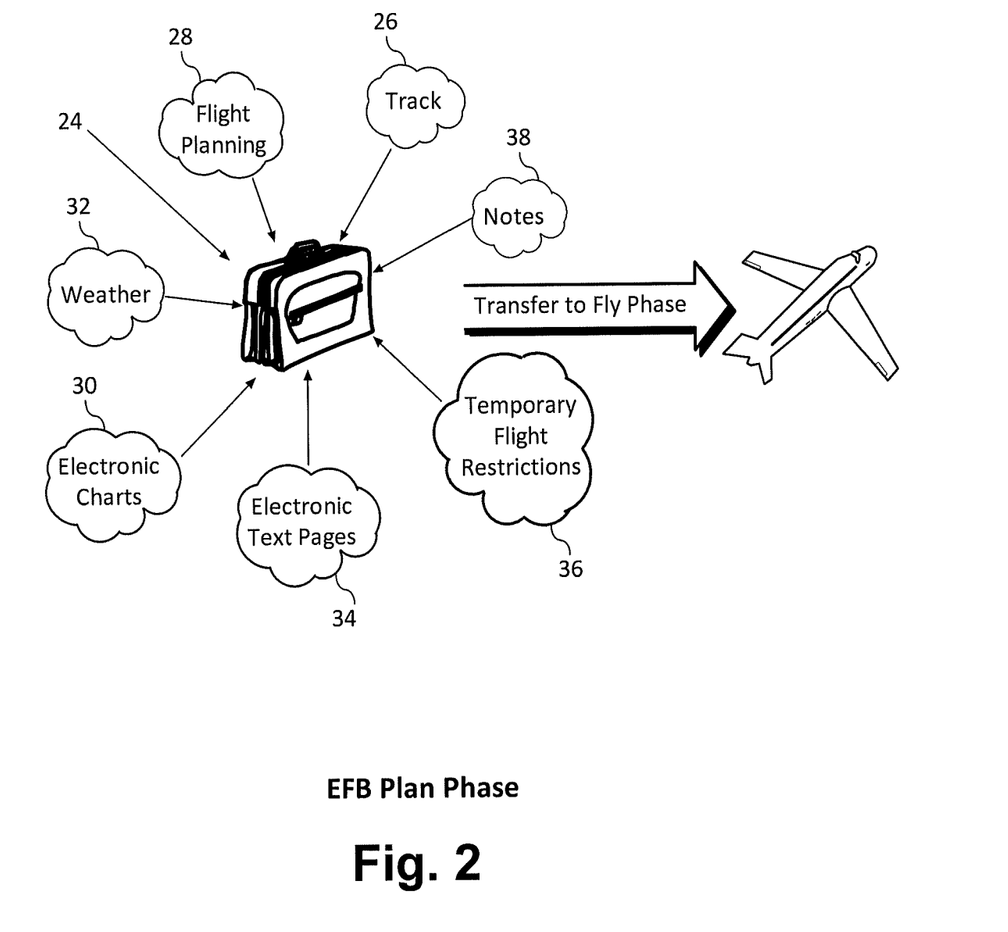
FIG. 2 is a block diagram illustrating an exemplary planning phase of the electronic flight bag used in accordance with an illustrated embodiment of the invention.

Turning to FIG. 2, the electronic flight bag is illustrated graphically and identified with the reference numeral 24. The electronic flight bag 24 may contain various flight-related objects selectable by the user. Exemplary flight related objects may include flight routes, as defined by way-points, identified as track information 26; flight planning data 28; identified as airport information that includes approach routes; navigational charts 30; weather data 32; electronic text data 34; temporary flight-restriction data 36 and notes 28.

Typically, the track 26 relates to route data, for example, data defined by various way-points. Flight planning data 28 may include various flight planning data, such as airport approaches. Electronic charts 30 may include various navigational charts, for example, such as available from www.jeppesen.com. Weather data 32 may consists of forecasted weather information, for example, from the National Weather Service, for the flight. The electronic text page object 34 may be used for various purposes. For example, for corporate users, electronic text pages may comprise the corporate policy with respect to corporate flights.

The temporary flight-restrictions object 36 may include various temporary flight restrictions related to the flight. These temporary flight restrictions can be used to restrict air travel through particular airspace for various purposes and other restrictions as dictated by the Federal Aviation Administration. The notes object 38 can be used for any supplemental notes by the user or pilot.

All of the above-mentioned data objects may be imported from various data sources and incorporated into the electronic flight bag 24 for use aboard the aircraft. Virtually any additional data objects can be added to the electronic flight bag. These data objects may be obtained from virtually any source and electronically stored in the electronic flight bag for later use aboard an aircraft.

Figure 3:
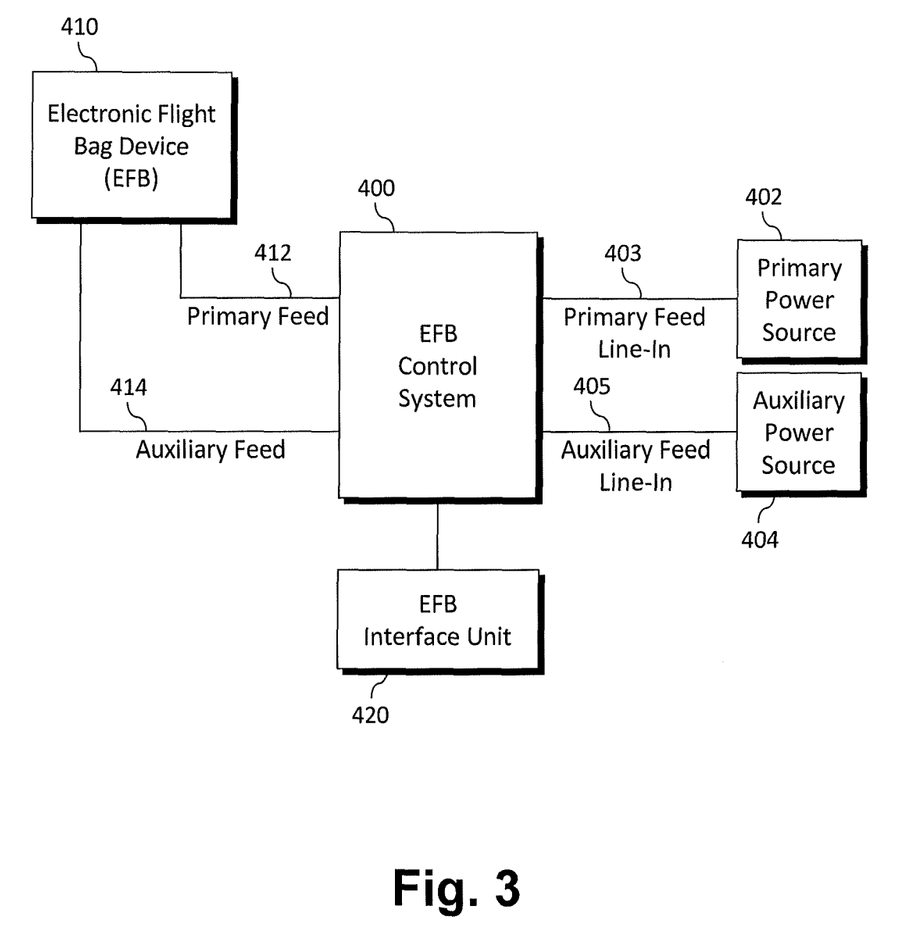
FIG. 3 is a block diagram illustrating the power supply system for use with an electronic flight in accordance with an illustrated embodiment of the invention.

With reference now to the illustrated embodiment of FIG. 3, shown is an EFB control system 400 coupled to a primary power source 402 and an auxiliary power source 404. It is to be understood and appreciated the EFB control system 400 consists of any computer logic (e.g., software, source code or the like) driven component (e.g., computer processor) capable of performing actions, such as providing power feeds, based on instructions/logic. Additionally, EFB control system 400 may consist a discrete logic controlled relay component or a transistor component. It is additionally to be understood and appreciated the EFB control system 400 may be configured to be positioned external of an EFB device 410 (as illustrated in FIG. 3) or alternatively be integrated with an EFB device 410 so as to be located therewithin. As to be described in further detail below, the EFB control system 400 is configured and operative to provide automatic power switching operations based upon a state of the aircraft.

With regards to the aforesaid primary power source 402 and auxiliary power source 404, each preferably consists of a device configured to provide DC electrical power sufficient to power the EFB device 410 (e.g. 28V DC, 115V AC 400Hz, 28V DC, etc.). For example, in the illustrated embodiment of FIG. 4, the primary power source 410 may be a electrical generator component driven by an aircraft engine and/or an external power source coupled to the aircraft when the aircraft is on ground and typically located at its terminal for providing electrical power thereto when the aircraft engine(s) is not operating. It is to be further appreciated and understood the primary power source 402 may also consist of an Auxiliary Power Unit (APU) device, battery component, an energy harvesting like device, or the like. With regards to the auxiliary power source 404, it may consist of a battery or like device that provides a reliable electrical power source. For instance, the auxiliary power source may consist of a Ram Air Turbine (RAT) or like device.

The EFB control system 400 is coupled or integrated into an EFB device 410 preferably via a primary power feed line 412 and a secondary power feed line 414. It is to be understood, and as mentioned above, the EFB device 410 may configured and operative as a device integrated into the flight cockpit of an aircraft (e.g., a permanently installed device) or may be configured and operative as standalone portable device (e.g., a tablet, laptop or other similar portable computer device) which contains all of the information normally included in a physical flight bag that may be required and desired for a particular flight contained in furtherance of a paperless cockpit environment as mentioned above.

Figure 4:
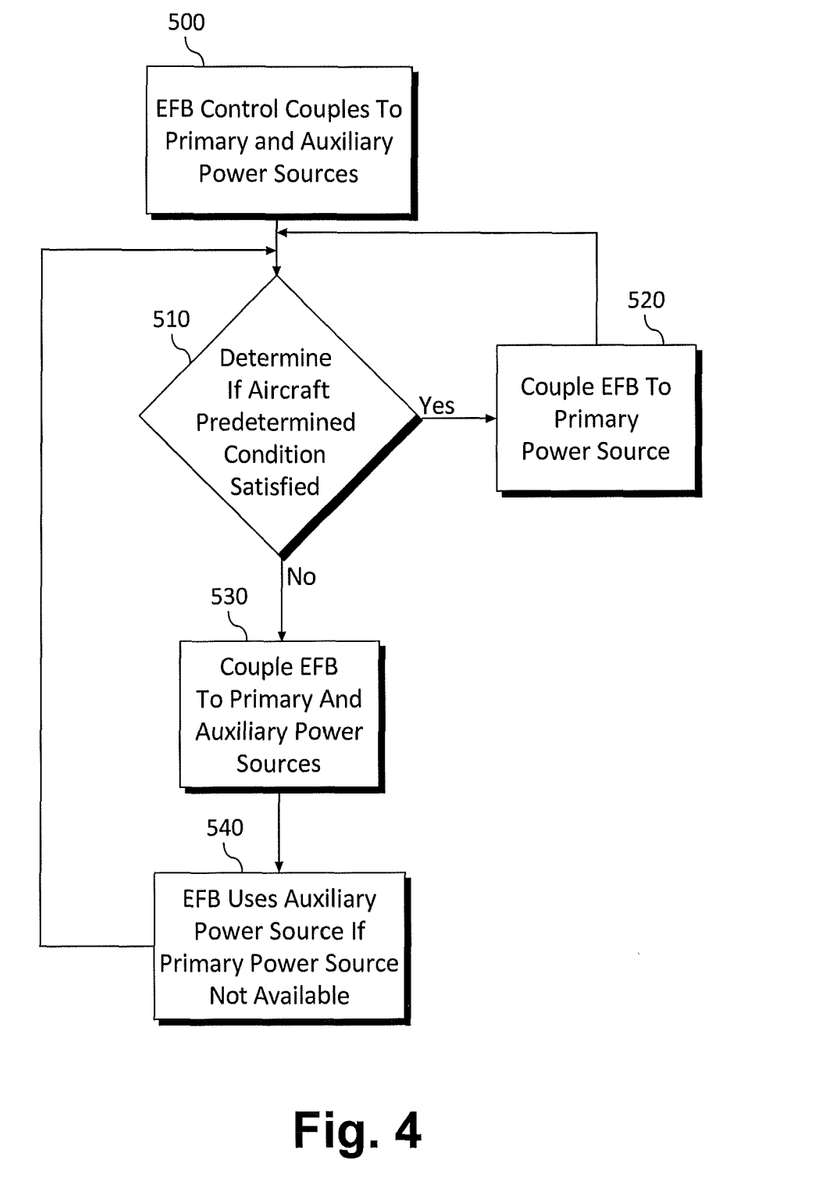
FIG. 4 is flow chart depicting operation of the power supply system illustrated in FIG. 3.

Additionally in the illustrated embodiment of FIG. 4, the EFB control system 400 is coupled to an EFB interface unit 420. It is to be appreciated and understood, the EFB Interface Unit 420 is preferably operative and configured to couple to numerous data generating systems/components of the aircraft for acquiring data from those systems/components and supplying it to the EFB control system 400 preferably in a proper data format.

With the essential elements of the invention in accordance with the illustrated embodiment of FIG. 3 being shown above, its method of operation will be described with reference to the illustrative flow chart depicted in FIG. 4. Starting at step 500, when the aircraft is in use (e.g., in a powered state whether on the ground or in the air), the EFB control system 400 couples to the primary power source 402 (via primary feed line 403) and to the auxiliary power source 404 (via auxiliary feed line 405). Next, at step 510, the EFB control system 400 determines if a predetermined condition for the aircraft has been satisfied (e.g., is the aircraft on the ground or in the air (which can be achieved via a number of ways as would be appreciated by one skilled in the art (e.g., an air/ground switch)), or is an L1 door closed, or is any other predetermined condition for the aircraft satisfied which would be determinative of which power supply is to be coupled to the EFB device 410). For illustrative purposes of the below description of the invention, the predetermined condition for the aircraft will be whether the aircraft is in flight or on the ground, however, as aforementioned, this flight/ground condition is not to be understood as the only predetermined condition for the aircraft (step 510) as it's only an illustrative predetermined condition.

If at step 510 it was determined the aircraft is in the air, then at step 520 the EFB control system 400 couples the EFB device 410 to only the primary power source 402 (via primary feed line 412) since while in flight there should be no interruption of power from the primary power source 402, which thus significantly preserves the storage power integrity of the auxiliary power source 404 since it should not be needed absent a catastrophic condition. Process then returns to step 510 to determine if the state of the aircraft has changed while the primary power source is solely coupled to the EFB device 410.

If at step 510 it was determined the aircraft is on the ground, then at step 530 the EFB control system 400 couples the EFB device 410 to both the primary power source 402 (via primary feed line 412) and the auxiliary power source 404 (via auxiliary feed line 414) to ensure there is no interruption of power to the EFB device 410 while the aircraft is on the ground. It is to be understood and appreciated, coupling the EFB device 410 to both the primary power source 402 and the auxiliary power source 404 is advantageous while the aircraft is on the ground since there is a likely occurrence that the power feed from the primary power source 402 will be interrupted when operation of the aircraft engine is terminated and the aircraft is switched to a ground power feed, or when there is an interruption of power from the ground power feed while it is used for providing electrical power to the aircraft while its engine is not operating. In such an instance of interruption of electrical power from the primary power source 402, the EFB device 410 is then preferably operative and configured to automatically switch to the auxiliary power source 404 such that there was no interruption of electrical power supply to the EFB device 410. As mentioned above, an interruption of electrical power to the EFB device 410 is disadvantageous. Process then returns to step 510 to determine if the state of the aircraft has changed while both the primary and auxiliary power sources are coupled to the EFB device 410.

Thus, and in accordance with the aforesaid illustrative embodiments, the invention provides switched power input based upon aircraft logic to avoid power loading limitations by permitting EFB connectivity to multiple aircraft power sources during ground operations when power is available via a battery source only and other non-normal situations.

Figure 5:
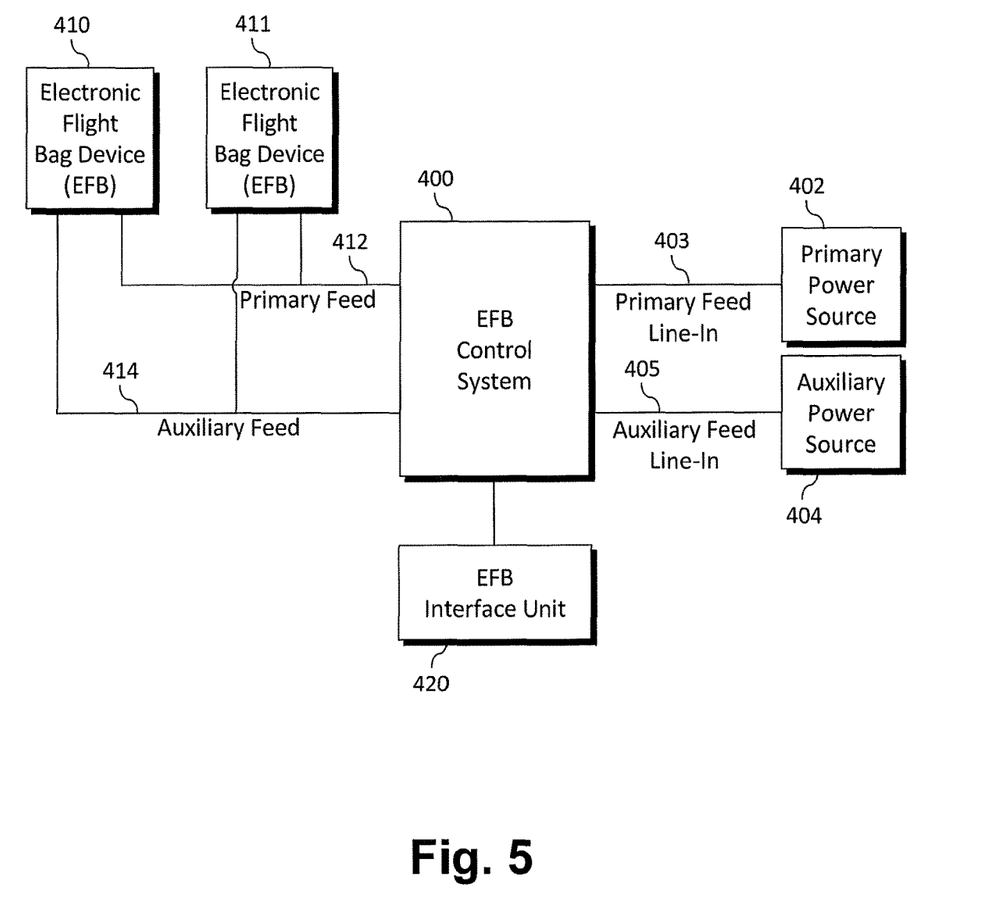
FIG. 5 is a block diagram illustrating the power supply system for use with an electronic flight bag in accordance with another illustrative embodiment of the invention.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. For instance, and with reference to FIG. 5, shown is another illustrative embodiment in which the EFB control system 400 is shown coupled to first and second EFB devices (410, 411) wherein operation thereof is the same as described above with reference to illustrative embodiments of FIGS. 3 and 4. Further, it is to be understood and appreciated the illustrative embodiment of FIG. 5 is not be understood to be limited to only first and second EFB devices (410, 411) but rather may be coupled to any plurality of EFB devices.

The above presents a description of a best mode contemplated for carrying out the present invention EFB electrical power control system, and of the manner and process of making and using them, in such full, clear, concise, and exact terms as to enable any person skilled in the art to which it pertains to make and use these devices and methods. The present invention wireless landing gear system is, however, susceptible to modifications and alternative method steps from those discussed above that are fully equivalent. Consequently, the present invention EFB electrical power control system is not limited to the particular embodiments disclosed. On the contrary, the present invention EFB electrical power control system encompasses all modifications and alternative constructions and methods coming within the spirit and scope of the present invention.

The descriptions above and the accompanying drawings should be interpreted in the illustrative and not the limited sense. While the invention has been disclosed in connection with the preferred embodiment or embodiments thereof, it should be understood that there may be other embodiments which fall within the scope of the invention as defined by the following claims. Where a claim, if any, is expressed as a means or step for performing a specified function, it is intended that such claim be construed to cover the corresponding structure, material, or acts described in the specification and equivalents thereof, including both structural equivalents and equivalent structures, material-based equivalents and equivalent materials, and act-based equivalents and equivalent acts.

What is claimed is:

1. A control system for providing electrical power to an electronic flight bag device on an aircraft, the control system comprising a power switching component coupled to a plurality of power source and at least one electronic flight bag device, wherein the control system is coupled to the at least on electronic flight bag device by a primary feed, wherein the primary feed is coupled only to a primary power source;

wherein the control system is coupled to the at least one electronic flight bag device by an auxiliary feed, wherein the auxiliary feed is coupled only to a secondary power source; and wherein the power switching component is operative and configured to selectively apply electrical power from at least one of the plurality of power sources base upon a condition of the aircraft.

2. A control system for providing electrical power to an electronic flight bag device on an aircraft as recited in claim 1, wherein the condition of the aircraft is in a pre-determined condition.

3. A control system for providing electrical power to an electronic flight bag device on an aircraft as recited in claim 2, wherein the power switching component is further operative and configured to couple only a single power source from the plurality of electrical power sources to the electronic flight bag device when the aircraft is in the pre-determined condition.

4. A control system for providing electrical power to an electronic flight bag device on an aircraft as recited in claim 3, wherein the power switching component is further operative and configured to couple one of the first or second power sources from the plurality of electrical power sources to the electronic flight bag device when the aircraft is not in the pre-determined condition.

5. A control system for providing electrical power to an electronic flight bag device on an aircraft as recited in claim 1, wherein the primary electrical power source is selected from the group consisting of an electrical power generator, a fuel cell, a battery device, and an energy harvesting device.

6. A control system for providing electrical power to an electronic flight bag device on an aircraft as recited in claim 5, wherein the primary electrical power source consists of an electrical power generator device located on the aircraft, wherein the primary elctrical power source and the secondary electrical power source are connected to the power switching component when the aircraft is not in the pre-determined condition.

7. A control system for providing electrical power to an electronic flight bag device on an aircraft as recited in claim 6, wherein the secondary electrical power source is selected from the group consisting of an electrical power generator, a fuel cell, a battery device, and an energy harvesting device.

8. A control system for providing electrical power to an electronic flight bag device on an aircraft as recited in claim 1, wherein the power switching component is coupled to at least first and second electronic flight bag devices.

9. A control system for providing electrical power to an electronic flight bag device on an aircraft as recited in claim 1, wherein at least one of the electronic flight bag devices is a portable self-contained device.

10. An electronic flight bag control system comprising:
a power switching component;
a primary feed-line-in coupling a primary power source to the power switching component;
an auxiliary feed line-in coupling an auxiliary power source to the power switching component;
a primary feed coupling at least one electronic flight bag device to the power switching component, wherein the primary feed is coupled only to a primary power source; and
an auxiliary feed coupling the at least one electronic flight bag device to the power switching component, wherein the auxiliary feed is coupled only to a secondary power source,
wherein the power switching component is operative and configured to selectively apply electrical power from at least one of the power sources from the plurality of power sources to the at least one electronic flight bag device based upon a condition of the aircraft.

11. An electronic flight bag control system as recited in claim 10, wherein the condition of the aircraft is whether the aircraft is in a predetermined condition.

12. An electronic flight bag control system as recited in claim 11, wherein the power switching component is further operative and configured to couple only one of the primary power source and the auxiliary power source to the electronic flight bag device when the aircraft is in a predetermined condition.

13. An electronic flight bag control system as recited in claim 12, wherein the power switching component is further operative and configured to couple at least the primary power source or the auxiliary power source to the electronic flight bag device when the aircraft is not in the predetermined condition.

14. An electronic flight bag control system as recited in claim 1, further comprising an electronic flight bag interface unit coupled to the power switching component operative and configured to couple data generating systems or components of an aircraft to the electronic flight bag control system.

15. A control system for providing electrical power to an electronic flight bag device on an aircraft as recited in claim 13, wherein the primary power source is selected from the group consisting of an electrical power generator, a fuel cell, a battery device, an energy harvesting device, and an external power source when the aircraft is in the predetermined condition.

16. An electronic flight bag control system as recited in claim 15, wherein the primary power source consists of an electrical power generator source is selected from the group consisting of an electrical power generator, a fuel cell, a battery device, an energy harvesting device, and an external power source when the aircraft is not in the predetermined condition.

17. An electronic flight bag control system as recited in claim 16, wherein the auxiliary power source is selected from the group consisting of an electrical power generator, a fuel cell, battery device , energy harvesting device, and an external power source.

18. A control system for providing electrical power to an electronic flight bag device on an aircraft as recited in claim 10, wherein the power switching component is coupled to at least first and second electronic flight bag devices.

19. A method for providing electrical power to an electronic flight bag on an aircraft comprising the step:
providing a power switching component;
coupling at least one electronic flight bag device to a primary power source through a primary feed;
coupling the at least one electronic flight bag device to a secondary power source through an auxiliary feed;
determining if the aircraft is in a predetermined condition;
applying electrical power via the power switching component from one of the primary power source and the secondary power source to the at least one electronic flight bag device when the aircraft is determined to be in the predetermined condition; and
applying electrical power via the power switching component from both the primary power source and the secondary power source to the at least one electronic flight bag device when the aircraft is determined not in the predetermined condition.

* * * * *